United States Patent [19]

Leroux et al.

[11] Patent Number: 5,095,787
[45] Date of Patent: Mar. 17, 1992

[54] MACHINE FOR MACHINING THE CYLINDER HEAD OF A THERMAL ENGINE

[75] Inventors: Jacques Leroux, Annecy le Vieux; Francois Gallez, Annecy, both of France

[73] Assignee: SERDI - Societe D'Etudes De Realisation et de Diffusion Industrielles, Annecy, France

[21] Appl. No.: 526,724

[22] Filed: May 22, 1990

[30] Foreign Application Priority Data

May 23, 1989 [FR] France ................. 89 06976

[51] Int. Cl.⁵ .............................. B23B 3/00
[52] U.S. Cl. ........................ 82/118; 82/1.11; 82/117
[58] Field of Search ............... 82/118, 1.11, 117; 356/138, 153

[56] References Cited

U.S. PATENT DOCUMENTS

| | | |
|---|---|---|
| 3,635,108 | 1/1972 | Prince . |
| 3,646,838 | 3/1972 | Anderson . |
| 4,172,665 | 10/1979 | Wakita et al. . |
| 4,294,526 | 10/1981 | Killmann et al. . |
| 4,417,816 | 11/1983 | Kindl et al. ............... 82/152 |

FOREIGN PATENT DOCUMENTS

| | | |
|---|---|---|
| 58-90437 | 5/1983 | Japan w/Eng. Ab. . |
| 59-19656 | 2/1984 | Japan w/Eng. Ab. . |
| 56-108905 | 8/1981 | Japan w/Eng. Ab. . |
| 4,294,526 | 10/1981 | Killmann et al. . |
| 2,343,209 | 10/1974 | W. Germany |

*Primary Examiner*—James G. Smith
*Assistant Examiner*—Lawrence Cruz
*Attorney, Agent, or Firm*—Oliff & Berridge

[57] ABSTRACT

The present invention relates to a machine for the machining of a metal block, especially for boring and facing.

The machine according to the invention comprises a laser sighting system making it possible to bring the component to be machined into coincidence with an axis (X) or a reference plane (XY). This system makes it possible, by means of removable optoelectronic sensors, to obtain a control signal allowing the holding table to be positioned in an assisted manual way or automatically, for example with a numerical control.

4 Claims, 3 Drawing Sheets

MACHINE FOR MACHINING THE CYLINDER HEAD OF A THERMAL ENGINE

BACKGROUND OF THE INVENTION

The present invention relates to a machine for machining the cylinder head of a thermal engine, that is to say making it possible to bore the two bearings of the camshaft and, if appropriate, to face the cylinder-head parting plane.

DESCRIPTION OF THE PRIOR ART

Such machines have already been provided, these comprising:

a stationary support or stand, a table for holding the cylinder head which is movable relative to the support according to at least three degrees of freedom, for example about three orthogonal axes forming a reference axis system, a boring tool working in a reference direction corresponding to the direction of advance of the said tool and/or a facing tool working in two perpendicular directions defining a reference plane corresponding to the facing plane, this reference direction or these reference directions being fixed relative to the support by virtue of the construction.

By means of suitable mechanisms for controlling the table, the cylinder head is brought into coincidence with the reference direction or the reference plane in order to carry out the machining work in the reference direction or in the said reference plane.

SUMMARY OF THE INVENTION

The subject of the present invention is a machine of the abovementioned type which makes use of a device with optical sighting, especially with laser sighting, so as to improve the machining precision, whilst at the same time simplifying the use of such a machine.

The subject of the present invention is a machine for machining the cylinder head of a thermal engine, with an optical sighting system designed specifically for the boring of two bearings of the camshaft and, if appropriate, for the facing of the cylinder-head parting plane, this system remaining simple to handle for the user, for example the repair technician.

According to the present invention, in cooperation or in combination:

at least one light-beam transmitter is fastened to the support or stand of the machine and is oriented so as to transmit the beam in the direction (X) of advance of the boring tool determined relative to the stand by virtue of the construction, at least one removable reference-beam sensor is designed to be arranged temporarily in at least one end bearing of the cylinder head, opposite the transmitter, in the boring direction (X') corresponding to the shaft line; the sensor then generates an electrical measurement signal, the value of which depends on the relative position of the image of the reference beam in relation to the center of the sensor and therefore on the relative orientation of the boring axis (X') in relation to the direction (X) of advance of the boring tool, a system for processing the measurement signal generates a signal for the control of the position of the table holding the cylinder head, in order to bring the boring direction (X') into coincidence with the direction of advance (X) of the boring tool.

As a result of the invention, by arranging the sensor temporarily on the cylinder head in the boring direction it is thus possible to bring the latter into superposition relative to the direction of advance of the boring tool. After the sensor has been removed, the boring can therefore be carried out accurately according to the shaft line of the cylinder head.

The present invention is now described with reference to the repair of cylinder heads of thermal engines and, more specifically, to the boring of the camshaft bearings, that is to say of the ring receptacles or rings forming these, on the one hand, and to the facing of the parting plane of the cylinder head, on the other hand.

DESCRIPTION OF THE PREFERRED EMBODIMENT

Figure 1:
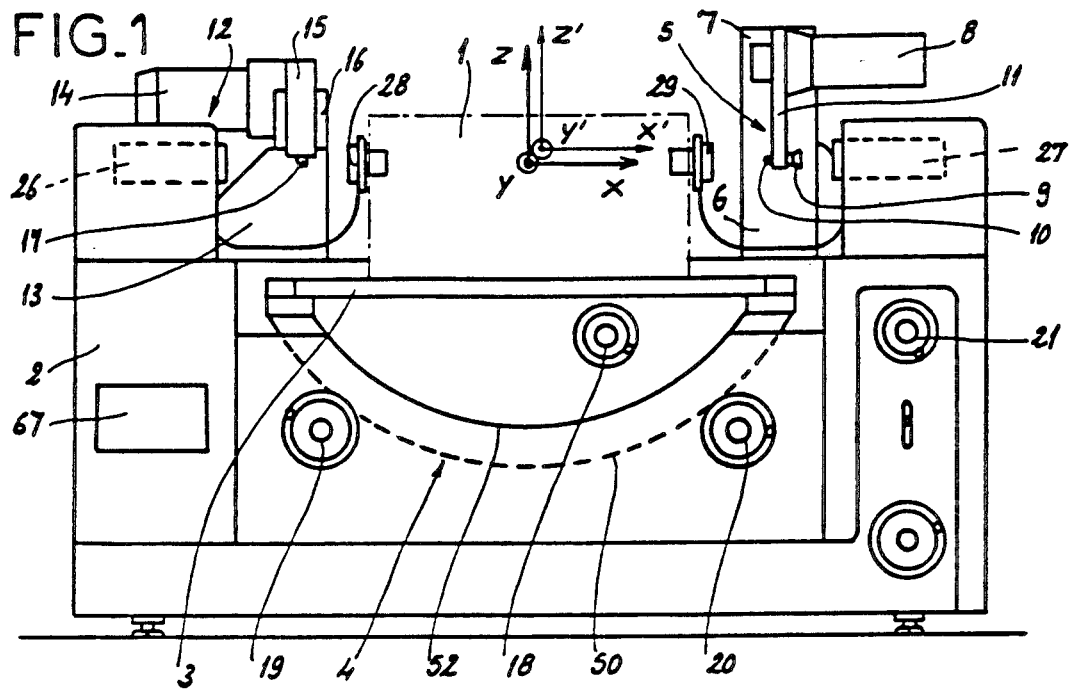
FIG. 1 shows a general front view of a machine according to the invention.

According to FIG. 1, the reference numeral (1) denotes a cylinder head of a thermal engine, of which both the camshaft line is to be bored along the axis (X') and the cylinder-head parting plane is to be faced along the facing plane represented by the axes (X') and (Y'). Hereafter, the axis (X') will therefore constitute the boring direction and the plane (X'Y') the facing plane.

Figure 2:
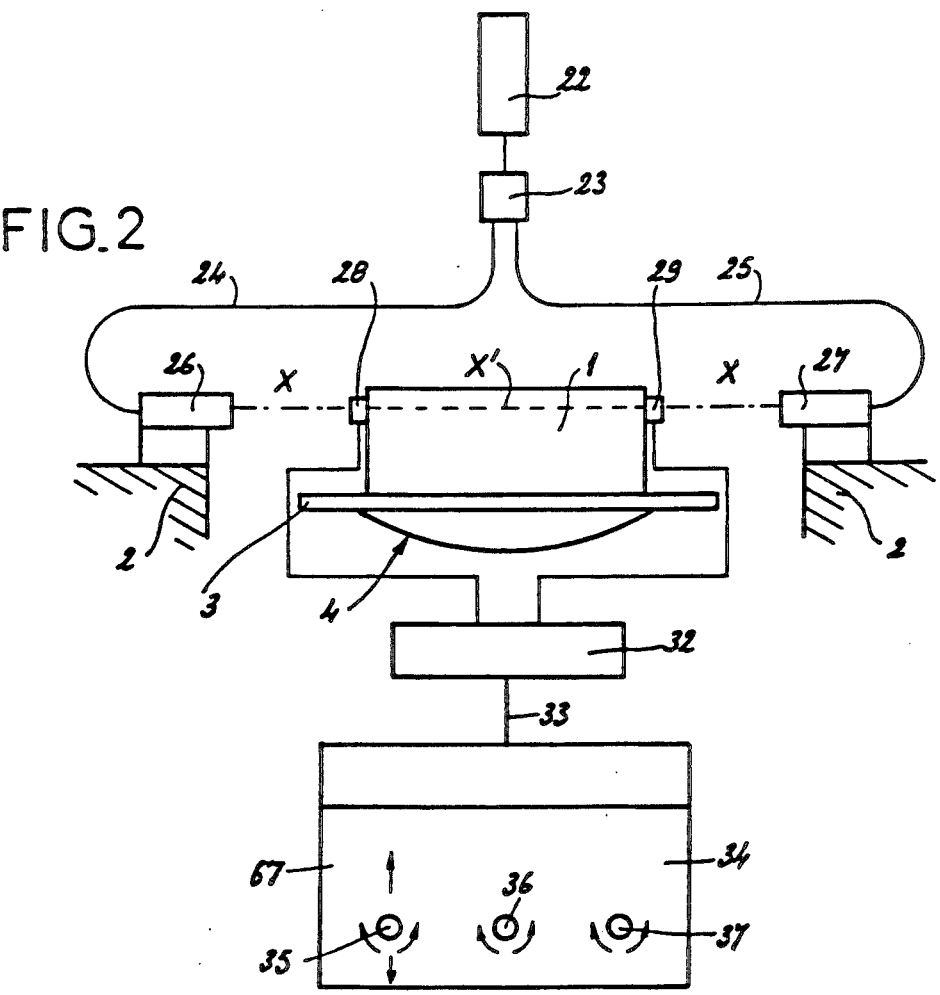
FIG. 2 shows the basic diagram of the laser sighting of the machine illustrated in FIG. 1, in association with a boring tool for the camshaft bearings.
Figure 3:
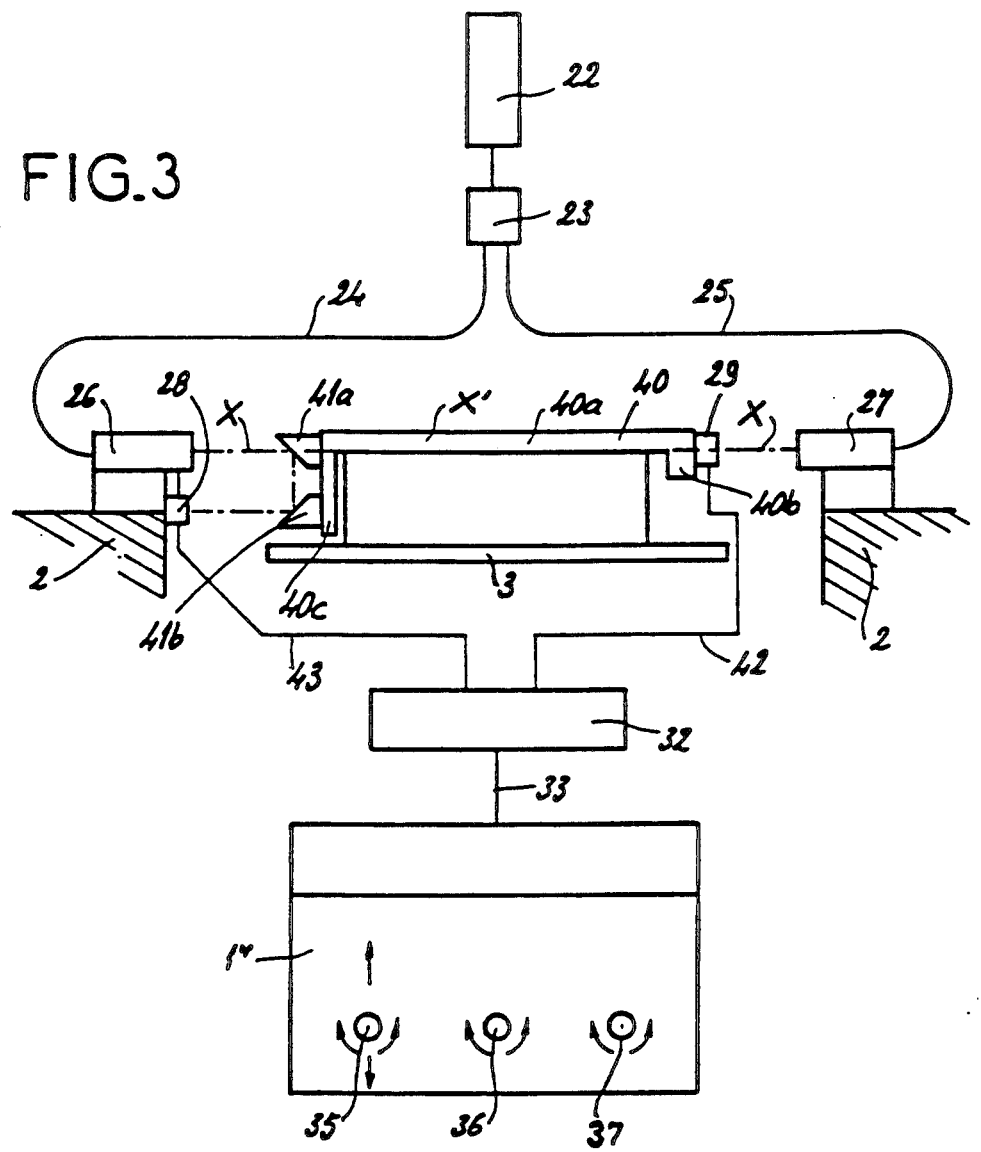
FIG. 3 shows the basic diagram of the laser sighting of the machine illustrated in FIG. 1, in association with a facing tool for the cylinder-head parting plane.

This machine, intended to be placed on a table at chest height for its handling and use, comprises the following main elements:

a stationary stand or support (2), a table (3) for holding the cylinder head (1) flat by removable fastening means (not shown), a device (4) mounted at the center of the stand (2) and allowing both, on the one hand, an orientation in space of the table (3) and therefore of the cylinder head (1) about three axes (X), (Y), (Z) forming a reference axis system fixed relative to the stand (2) by virtue of the construction and, on the other hand, a positioning in terms of height according to the reference axis (Z) of the table (3); the axis (X) is identical to the direction of advance of the boring tool presented below, a boring tool or head (5) arranged on one side of the support (2), for example on the right according to FIG. 1, and movable in the reference direction (X); in a way known per se, this boring head comprises a carriage (6) for advancing in the direction (X), moving on a rail (not shown), a vertical back-off column (7) for passing from bearing to bearing, a cutting motor (8), a horizontal mini-spindle (9) for machining in the direction (X) and equipped with a boring tip (10), and finally a transmission (11) between the cutting motor (8) and the spindle (9), a facing tool or head (12) arranged on the other side of the stand (2), that is to say on the left according to FIG. 1, and movable in the reference plane (X, Y), hereafter called the machining plane; this head comprises, in a way known per se, a carriage (13) capable of moving in the machining plane by means (not shown), a cutting motor (14), an arm (15) carrying a facing tool (16) consisting of a cutting tool, the arm (15) being supported by the advancing carriage (13), and finally a slide (17) allowing the return of the arm (15) in order to release the cutting tool (16), a control panel (67) for positioning the table (3) on the one hand and for controlling the boring tool (5) and facing tool (12) on the other hand; this panel (67) is described more specifically by reference to FIGS. 2 and 3, various members for the manual control of the position of the table (3), and more specifically a manual control (18) of yawing about the axis (Z), a manual control (19) of rolling about the axis (Y), a manual control (20) of pitching about the axis (X), and finally a manual control (21) of translational motion or adjustment of the level of the table (3) according to the axis (Z).

Figure 4:
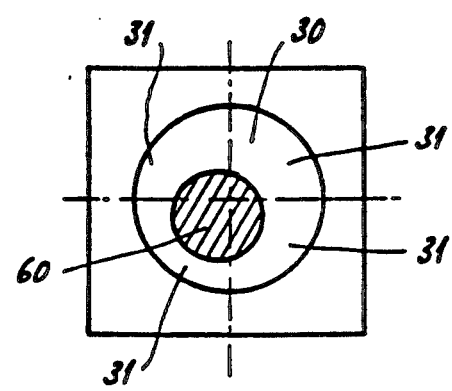
FIG. 4 shows diagrammatically the receiver of an optoelectronic laser-sighting sensor used according to the invention.

As regards the boring of the two bearings of the camshaft, embodying the direction (X') coinciding with the shaft line, the laser sighting system illustrated in FIG. 2 comprises:

a coherent light source (22), a separator (23) of the beam emitted by the source (22) into two separate beams, and two optical fibers (24) and (25) for carrying the two separate beams, two collimators (26, 27) receiving the two separate beams (24, 25) respectively; the transmitters (26, 27) are fastened to the support (2) on either side of the holding table (3); they are aligned with one another in the direction of advance (X) of the boring tool and transmit two coherent light beams likewise aligned in the direction (X), two optoelectronic sensors (28) and (29) arranged removably on either side of the cylinder head (1) opposite the two transmitters (26) and (27) respectively; these two sensors (28, 29), arranged in the two end bearings of the camshaft line, are thus aligned according to the boring axis (X'); as shown diagrammatically in FIG. 4, each sensor (28) or (29) comprises a receiver (30) sensitive to the image of the received reference beam and divided into sectors, for example into quadrants (31), in such a way that the sensor generates an electrical measurement signal, the value of which depends on the relative position of the image of the reference beam in relation to the receiver (30), and more specifically in relation to its center; thus, the measurement signal transmitted by each sensor (28) or (29) varies or represents the relative orientation of the boring axis (X') in relation to the axis of advance (X) of the boring tool, a system (32) for processing the measurement signals received from the sensors (28, 29) which generates a signal (33) for controlling the position of the table (3) from the orientation system (4), making it possible to bring the boring axis (X') into coincidence with the axis of advance (X) of the boring tool manually or automatically.

In fact, from the signal (33), if the device (4) for the orientation of the table (3) comprises three motors for movement or orientation about three axes (X, Y, Z), the control signal (33) is used to actuate the three motors respectively according to the value of the control signal and thus bring the axis (X') into coincidence with the axis (X). If the positioning device (4) is controlled manually, as shown in FIG. 1, the control signal (33) is used for displaying on the panel (67) the manual corrections to be made to the position of the table by means of handwheels (18 to 21), and thereby bringing the boring axis (X') manually into coincidence with the axis of advance (X) of the boring tool. Thus, the panel (67) comprises three indicator lamps (35 to 37) associated respectively with the axes (Z, X and Y) and lighting up when there is coincidence according to each of these axes with the origin of the reference axis system. The arrows associated with each of the indicator lamps, when these light up, indicate to the operator the manual control to be actuated and in which direction.

According to FIG. 3, for the facing of the parting plane of the cylinder head, represented by the axes (X') and (Y'), the laser sighting system remains substantially the same, but is employed according to different procedures explained below:

a removable sighting tool (40) comprising a plate (40a) with two rims (40b and 40c) is arranged on the surface (1a) to be ground; this tool possesses on either side of a metal block (1), namely on the rims (40b) and (40c), respectively the first removable sensor (29) and an optical system (41) comprising two mirrors (41a and 41b) arranged at 90° relative to one another; the first sensor (29) is directed in the boring axis (X'), hence in the facing plane (X'Y'), and is opposite the transmitter (27); consequently, the sensor (29) generates a measurement signal (42) representing the position of the boring axis (X') in relation to the reference axis (X); the optical axis of the first mirror (41a) is aligned with the axis of the first sensor (29), namely the axis (X') in the facing plane (X'Y'), the second removable sensor (28) is fastened to the support (2), opposite the second mirror (41b) and below the transmitter (26); the optical axis of the second mirror (41b) is aligned with the reception direction of the sensor (28); under these conditions, the sensor (28) generates a measurement signal representing the position of the facing plane (X'Y') about the axis (X) in relation to the machining plane (XY), when the boring axis (X') already coincides with the axis of advance (X) of the boring tool, the processing system (32) is designed or programmed in a different way, that is to say for processing the two measurement signals (42, 43) transmitted by the sensor (29) and the sensor (28) respectively, in order to generate a control signal (33) for the orientation of the holding table (3) and to bring the facing plane (X'Y') into coincidence with the machining plane (XY).

According to FIG. 3, it will be seen incidentally that, as before, the two laser transmitters (26, 27) remain fixed to the support (2) on either side of the holding table (3) and remain aligned so as to transmit two beams of coherent light in the direction (X). Consequently, where the transmitters are concerned, there has been no modification in the change from boring to facing.

It can be seen from FIG. 3 that any deviation in position of the plane (X'Y') relative to the plane (XY) shifts the beam reflected by the mirror (41b) and therefore the image of the beam transmitted by the source (26) in relation to the sensitive receiver of the sensor (28). Under these conditions, the measurement signal transmitted by the sensor (28) to the system (32) truly represents the position of the plane (X'Y'), once coincidence between the axes (X) and (X') has been established.

Figure 5:
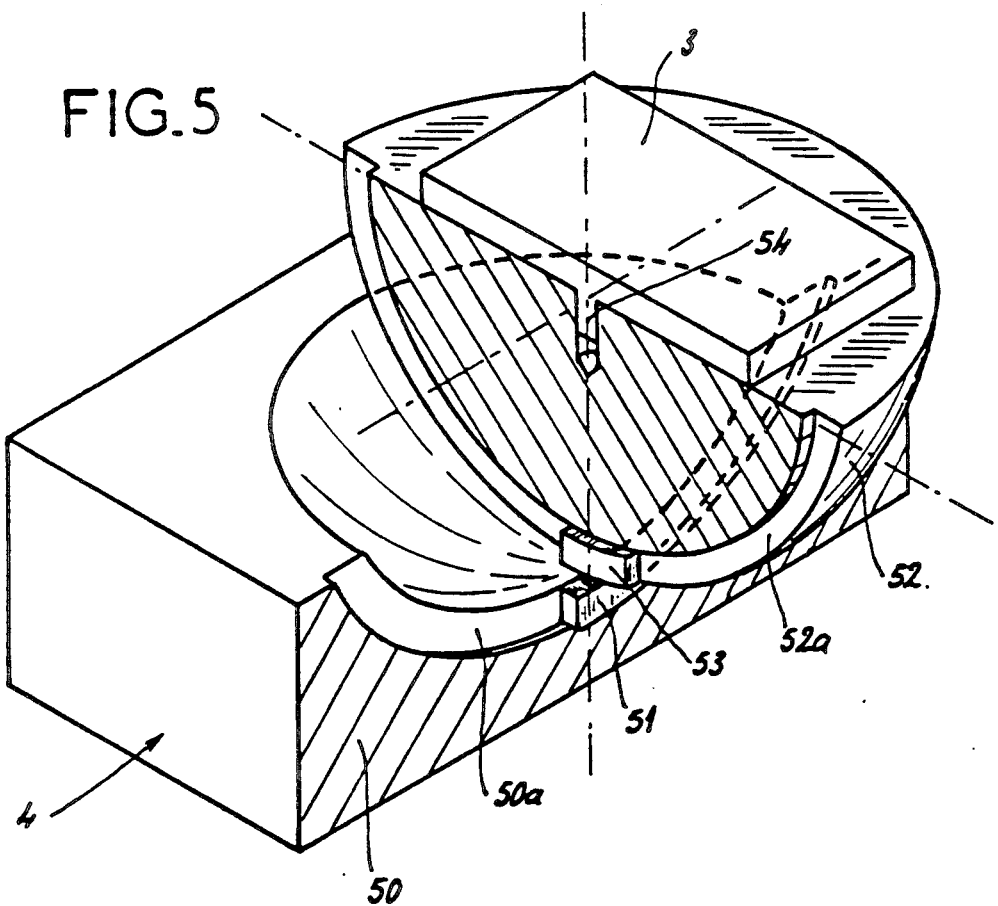
FIG. 5 shows in perspective the diagram of the principle of the device for orienting the table belonging to the machine according to FIG. 1 and allowing a pitching, rolling and yawing movement of the said table about three axes forming an orientation axis system.

In conclusion, FIG. 5 illustrates a device (4) for the orientation of the table (3) according to the three axes (X, Y, Z), which comprises:

a spherical cradle (50) having a first equatorial slideway (50a), in which a first slide (51) is mounted slidably, a spherical shell (52) having a second equatorial slideway (52a) which is arranged orthogonally relative to the first slideway (50a) and in which a second slide (53) is mounted, the first (51) and second slides (53) being fixed one above the other about a common axis of rotation, with a functional tolerance between the two for the passage of the shell (52), the table (3) being mounted on the shell (52) rotatably about an axis (54) passing through the center of the sphere associated with the latter, the cradle (50) being movable and adjustable in terms of its level or height by means (not shown).

The cradle (50) allows a pitch orientation about the axis (X), the shell (52) a roll orientation about the axis (Y) and the axis (54) a yaw orientation about the axis (Z).

The present invention is not limited to the orientation described above for the reference series (X, Y, Z) and (X', Y', Z') and placing the facing plane (X'Y') horizontally. Other orientations can be adopted in order, for example, to place the facing plane (X'Y') vertically.

We claim:

1. A machine for machining a cylinder head of a thermal engine, making it possible at least to bore two bearings for a camshaft in a boring direction coinciding with a longitudinal axis of the camshaft, the machine comprising: a support; a boring tool working in a direction of advance fixed relative to the support by virtue of the construction; and a table for holding the cylinder head, the table being movable relative to the support around at least three axes including the direction of advance of the boring tool, wherein the machine incorporates an optical sighting system of a laser-sighting type, comprising:

at least one light-beam transmitter fastened to the support and oriented so as to transmit a coherent light beam in the direction of advance of the boring tool;

at least one removable reference-beam sensor mounted temporarily in at least one camshaft bearing of the cylinder head, opposite the light beam transmitter, the sensor generating an electrical signal a value of which indicates the relative position of an image of the coherent light beam in relation to a center of the sensor and therefore a relative orientation of a boring axis in relation to the direction of advance of the boring tool; and a system for processing the electrical signal to generate a further signal for the control of a position of the table holding the cylinder head in order to bring the boring direction into coincidence with the direction of advance of the boring tool.

2. A machine as claimed in claim 1, wherein two transmitters are fastened to the support, one transmitter on either side of the cylinder head holding table, the transmitters being arranged opposite one another and each transmitting a light beam, the transmitters and their transmitted light beams being aligned in the direction of advance of the boring tool, one removable sensor temporarily mounted in each of the two bearings on either side of the cylinder head and opposite one of the two transmitters, the two sensors being aligned along the boring axis whereby each of the two sensors generates a measurement signal, and the processing system receives these two measurement signals for use in generating the further control signal.

3. A machine as claimed in claim 2, also making it possible to face a metal block portion of a cylinder head along a cylinder head parting plane according to a facing plane passing through the boring axis further comprising:

a facing tool capable of being moved in two directions, including the direction of advance of the boring tool, and therefore in a machining plane;

a removable sighting tool for temporary mounting on the cylinder-head parting plane and comprising on a first side, a first one of said two sensors oriented in the boring axis and positioned opposite one of the light beam transmitters to generate a measurement signal representing the position of the boring axis in relation to the direction of advance of the boring tool and, on an opposite second side, two mirrors having reflecting surfaces arranged 90° to one another, the mirrors being positioned one above the other with a top mirror opposite the other light beam transmitter such that an optical axis of the top mirror is aligned with an axis of the first sensor, wherein a second of the two sensors is fastened temporarily to the support, opposite a lower one of the two mirrors, to generate a measurement signal representing a position of the facing plane about the direction of advance of the boring tool in relation to a reference plane, and the processing system makes it possible to process the two measurement signals generated by the two sensors to produce the further signal for controlling the holding table such that the facing plane may be brought into coincidence with the reference plane.

4. A machine as claimed in claim 1, further comprising a device for orienting the table around the three axes defined as an X axis, a Y axis, and a Z axis respectively, wherein the device comprises: a semi-spherical cradle allowing a pitch orientation about the X axis; a semi-spherical shell on which the table is rotatably mounted, the semi-spherical shell allowing a roll orientation about the Y axis and the rotatably mounted table allowing a yaw orientation about the Z axis; and a first slide and a second slide which are arranged one above the other at right angles to one another, the first slide being mounted slidably in a first equatorial slideway of the semi-spherical cradle, and the second slide being mounted slidably in a second equatorial slideway of the semi-spherical shell such that a separation exists between the first and second slides so that the semi-spherical shell may move free of obstruction by the semi-spherical cradle.

* * * * *